2,793,110
PROCESS FOR MANUFACTURING A HIGH GRADE STEEL

Johannes Kosmider and Herbert Neuhaus, Hagen-Haspe, Germany

Application November 10, 1954, Serial No. 468,141

Claims priority, application Germany November 13, 1953

9 Claims. (Cl. 75—60)

The present invention relates to a process for manufacturing a high grade steel from crude or pig iron containing phosphorus, and more particularly to a process for manufacturing a high grade steel from pig iron containing phosphorus employing a bottom-blown converter operating with normal air or air enriched in oxygen.

The oxidation of pig iron in a bottom-blown converter with various refining agents, such as normal air or air enriched in oxygen, oxidizes the elements contained in the pig iron according to physical-chemical laws one after the other, and particularly starting with silicon, manganese, carbon, and only after formation of a molten slag, the phosphorus is oxidized. According to the phosphorus content of the pig iron, a dephosphorization results which takes a longer or shorter time according to the degree of the oxidation of the carbon. The final phosphorus content of the steel determines at the same time the iron content of the slag.

For the iron producing industry it is of great interest to oxidize phosphorus containing pig iron in such a manner that the phosphorus contained in the iron is entirely or partly removed before or during the period of decarbonization in order to reduce the dephosphorization or the afterblow period, or at a preliminary separation of the phosphorus to finish the entire process at a higher carbon content. This method of operation involves metallurgical and technological advantages so that the slagging of the iron is governed not by the phosphorus content but by the residual carbon content and that an additional recarbonization of the bath is not needed in order to obtain higher strength values of the steel. Former tests in bottom-blown converters have shown that an advancing of the dephosphorization is practically impossible because certain conditions cannot be satisfied without difficulties. If the pig iron bath is refined with the said known refining gases in a short time amounting to approximately eight to twelve minutes, a high velocity of decarbonization results which prevents the formation of slags containing ferric oxide. However, the dephosphorization is only possible in the presence of liquid basic slags containing ferrous oxide. Thus the dephosphorization within the period of decarbonization is possible only if the refining process with a bottom-blown converter is conducted so that the velocity of decarbonization does not exceed a certain value of approximately 0.20 to 0.25% per minute. At a mean carbon content of approximately 3.5% in the pig iron, the maximum velocity of decarburization should result in a blowing time amounting to at least 18 minutes.

In order to obtain a blowing time of 18 minutes the corresponding bottom blowing cross-section should be chosen according to the size of the converter corresponding to the blowing pressure conditions. However, the dephosphorization within the period of decarburization is possible only if, alongside with the lowered velocity of decarburization, care is taken for the simultaneous formation of a slag containing ferrous oxide and being in the liquid state from the beginning of the refining process.

For the formation of liquid basic slags containing ferrous oxide, for instance, an ore is suitable. However, the addition of ores for forming a ferrous oxide containing liquid basic slag makes certain requirements to the heat economy of the normal converter process. If an air flow is applied the excess heat is so small that an addition of, for instance, ore cannot take over the formation of liquid slags. An air flow rich in oxygen improves the conditions to a certain extent, however, it is practically unusable because of the lower consistency connected therewith.

For this reason it has been suggested to refine the pig iron in a cup-like vessel without a tuyere bottom by means of a jet of pure oxygen blown in at supersonic speed by means of a lance. The defect of such a method of operation resides in the resulting extremely low speed of decarbonization and the correspondingly lengthened blowing period amounting to 50 to 80 minutes for injecting the air into a pig iron containing phosphorus.

The process employing a bottom-blown converter operated with normal air or air enriched in oxygen avoids this defect because the bottom blowing gases cause, alongside the oxidizing effect, a stirring effect within the melting bath, this melting effect being indispensable for an efficient operation.

It is an object of the present invention to improve this process in such a manner that high grade steels may be economically produced by it from pig iron containing phosphorus. According to the invention a process is suggested for the manufacture of high grade steels from pig iron containing phosphorus by means of a bottom-blowing converter operated in the usual manner with normal air or air enriched in oxygen, which is characterized in that, at a temporary addition to the bath according to requirement of gases being rich in oxygen at low pressures and with reduced velocities, the dephosphorization is wholly or partly advanced in time into the decarbonization period by means of a current or temporary addition of cooling oxygen carriers from the beginning of the refining by an accelerated formation of liquid basic slags containing ferrous oxide at a simultaneous low decarbonizing speed amounting, for instance, to .20 to .25% per minute.

It has been found as particularly suitable for carrying out the process, that it is advisable for the formation of liquid basic slags containing ferrous oxide, to add to the melt as a cooling oxygen carrier before the starting of the oxidizing process continuously an ore, the slag forming compounds, for instance lime, being added, either once at the beginning, or in smaller quantities currently or periodically during the blowing process.

Furthermore, it has proved to be particularly advantageous for the formation of a liquid basic slag containing ferrous oxide to use gases rich in oxygen, said gases being blown temporarily according to demand additionally against the bath, for instance by means of a lance, said gases consisting of a mixture of oxygen and steam. With such a mixture the surface of the bath is strongly oxidized and cooled at the same time so as to assist the dephosphorization and at the same time to retard the premature decarbonization.

Obviously, the oxygen carriers promoting the formation of the liquid basic slag containing ferrous oxide may be admixed in any ratio adapted to the necessary heat economy of the bath. Thus, a feature of the invention facilitating in an advantageous manner the adaptation of the process to various operating conditions consists in that oxygen carriers of any kind in mutually depending mixing ratios are used for the formation of liquid basic slags containing ferrous oxide.

It has been found to be advantageous for the realization of the low decarbonizing velocities required according to the present invention, that is for a lengthening of the blowing time, to reduce the blowing cross-section of the tuyere bottom.

It has been found favorable for carrying out the process according to the invention to maintain at the blowing of gases rich in oxygen a low blowing velocity and/or pressure so that no oxygen penetrates into the bath, merely an oxidation of the iron being obtained at the surface of the bath for liquefying the slag.

For example, the bath is blown at with a gas having an excess pressure of three to five atmospheres. In this way, besides the object of an accelerated formation of a liquid basic slag containing ferrous oxide, an additional combustion of the exhaust gases is prevented. Care should be taken that the blowing period of the gas jet additionally blown to the bath does not last longer than the formation of the slag rich in iron and sufficient for a complete dephosphorization, and for obtaining a substantial dephosphorization. The oxygen concentration of the blowing air has to be chosen in such a way that a blowing period of not less than 18 minutes is kept, that is, that the decarburizing speed does not exceed 0.20–0.25% per minute. The oxidation process proper is effected in customary manner by means of the gas blown in through the tuyere bottom of the converter.

A further advantage of the blowing of air rich in oxygen or mixtures of oxygen and steam resides in the prevention of an additional development of brown smoke such as it is observed with the known blowing processes using pure oxygen.

It has been suggested to advance in time the dephosphorization by using, during the entire oxidation process in the converter, oxygen containing gases for an aftercombustion of the exhaust gases from the oxidizing process in order to obtain by the heat developing thereby an additional liquefaction of the slag and, thus, a separation of the phosphorus. However, the success is doubtful because the additionally gained heat benefits the slag only to a minor extent and particularly without FeO as fluxing agent, a liquefying of the slag and a dephosphorizing reaction cannot be obtained. This means that just because of the high temperature an additional dephosphorization does not take place because the dephosphorization depends on the temperature and because an additional formation of ferrous oxide is always prevented at an increased velocity of decarbonization.

Thus an advance in time of the dephosphorization is only possible according to the suggestion of the present invention, by adding cooling oxygen carriers, such as ore while maintaining a low decarbonizing speed so that the addition of ore during the additional supply of oxygen cools the bath and the slag in order to shorten the dephosphorization. The blowing of oxygen in one or the other form should only be maintained as long as no additional increase in temperature of the bath is caused because otherwise the dephosphorization is prevented at increasing temperatures by an increased decarbonization.

The addition of slag forming substances such as lime, either once at the beginning of the blow process, or in smaller portions currently or interruptedly during the blow process has an advantageous effect on the process.

The present invention breaks away from the former teaching of the art that it is impossible with bottom blowing converters to obtain an advance in time of the dephosphorization, thus obtaining the advantage that the entire steel-producing process is finished at a higher carbon content without carbonization for obtaing the previously mentioned metallurgical and technological advantages by disclosing, for the first time, a method of using a bottom blowing converter for obtaining the advance of the dephosphorization.

The present invention shall be further explained with respect to the following examples:

*Example 1.*—Charge of 1.9 tons pig iron having the following non-ferrous elements:

3.78% C
0.32% Si
0.84% Mn
1.62% P
.006% N pig iron and 110 kilograms lime were charged into the converter and the latter was then raised for blowing. The blowing cross-section amounted to six holes of 10 millimeters=4.75 square centimeters. Through the bottom air was added at a pressure of 1.8 atmospheres. After 0.5 minute pure oxygen was blown against the surface of the bath by means of a lance having a cross-sectional area of 2 square centimeters and a distance of 500 millimeters from the surface of the bath. The blowing pressure amounted to three atmospheres. After 3 minutes further 110 kilograms of lime and 100 kilograms of ore were added. After 17 minutes the lance was removed and from the reversed converter a sample was taken which contained the following non-ferrous components:

0.64% C
Traces of Si
0.35% Mn
0.07% P
0.025% S
0.007% N

Subsequently the lance was no longer required for the further decarbonization of the steel and the melt was finished by blowing air rich in oxygen (30% $O_2$) through the bottom. The oxidizing process was finished after 20 minutes. The composition of the non-ferrous components of the steel was as follows:

0.11% C
0.28% Mn
0.045% P
0.028% S
0.008% N

The steel needed no deoxidation.

As oxidizing gas was added to the converter:

Through the bottom 175 normal cubic meters air=36.6 normal cubic meters $O_2$=92 normal cubic meters air per ton pig iron and 8.8 normal cubic meters $O_2$=4.6 normal cubic meters per ton pig iron, Through the lance:

79 normal cubic meters $O_2$=41.5 normal cubic meters per ton pig iron.

*Example 2.*—2.05 tons of pig iron having additions of 3.66% C
0.39% Si
0.9% Mn
1.7% P
0.054% S
0.007% N were charged. Before the beginning of the blowing 110 kilograms lime were charged. Through the bottom of the lifted converter having a blowing cross-section of 4.75 square meters, air was blown at a blowing pressure of 1.8 atmospheres. After 0.5 minute the lance was brought into position and a mixture of oxygen and superheated steam in the mixing ratio of 1:1 was blown on the bath at 3 atmospheres pressure. The distance of the tuyere from the surface of the bath amounted to approximately 400 millimeters. After 4 minutes further 55 kilograms of lime and 50 kilograms of ore were added. After 8 minutes a further addition of 50 kilograms of lime was made. From the 8th minute onward air being rich in oxygen (35% $O_2$) was added through the bottom. After 21 minutes the lance was removed and from the tilted converter a sample was taken having the following non-ferrous elements:

0.22% C
Traces of Si
0.27% Mn
0.061% P
0.024% S
0.006% N

Since the melt contained too much carbon for the desired purpose, a final blowing was effected through the bottom until the non-ferrous additions showed the following composition:

0.05% C
0.024% Mn
0.04% P
0.025% S
0.007% N

As refining gasses were added:
Through the bottom:
1-8 minutes 66 normal cubic meters of air=32 normal cubic meters per ton pig iron, from the 8th minute to the 22nd minute 114 normal cubic meters air=55 normal cubic meters per ton pig iron and 25 normal cubic meters $O_2$=12 normal cubic meters per ton of pig iron,
Through the lance:
0.5-21 minutes 55 normal cubic meters $O_2$=27 normal cubic meters per ton pig iron and 55 normal cubic meters $H_2O$=27 normal cubic meters per ton of pig iron.

What is claimed and to be secured by Letters Patent is:

1. A process for manufacturing high grade steel of low phosphorus content in a bottom-blowing converter through the bottom of which an oxidizing gas is blown under pressure, wherein the melt is dephosphorized by rapid formation of basic liquid slag, comprising the steps of blowing against the surface of the bath of molten iron a gas rich in oxygen at a low pressure and velocity so as to preclude penetration of the oxygen into said molten bath, and adding to said bath a slag-liquefying material, the formation of the basic slag containing ferrous oxide being carried out at a simultaneous low speed of decarbonization, whereby the dephosphorization is at least partly advanced in time into the decarbonization period.

2. A process according to claim 1, wherein said oxidizing gas blown through said bottom comprises air.

3. A process according to claim 1, wherein said oxidizing gas blown through said bottom comprises air and oxygen.

4. A process according to claim 1, wherein said slag-liquefying material is added in portions, the first portion being added before the blowing is started.

5. A process according to claim 1, wherein said gas rich in oxygen comprises a mixture of oxygen and steam.

6. A process for manufacturing high grade steel of low phosphorus content in a bottom-blowing converter through which air under pressure is blown, wherein the melt is dephosphorized by rapid formation of a basic liquid slag containing ferrous oxide, comprising the steps of blowing against the surface of the bath of molten iron a gas rich in oxygen at a low pressure and velocity so as to preclude penetration of the oxygen into said molten bath and adding to said bath a slag-liquefying material and a cooling oxygen carrier, the slag formation being carried out at a simultaneous low speed of decarbonization amounting to 0.20 to 0.25% per minute, whereby the dephosphorization is at least partly advanced in time into the decarbonization period.

7. A process according to claim 6, wherein said cooling oxygen carrier is an ore.

8. A process for manufacturing high grade steel of low phosphorus content in a bottom-blowing converter through which air under pressure is blown, wherein the melt is dephosphorized by rapid formation of basic liquid slag containing ferrous oxide, comprising the steps of blowing against the surface of the bath of molten iron a gas rich in oxygen at a pressure of from 3 to 5 atmospheres and at a velocity sufficiently low to preclude a penetration of oxygen into the molten bath, and adding to said bath a slag-liquefying material and a cooling oxygen carrier, the slag formation being carried out at a simultaneous low speed of decarbonization amounting to 0.20 to 0.25% per minute, whereby the dephosphorization is at least partly advanced in time into the decarbonization period.

9. A process for manufacturing high grade steel of low phosphorus content in a bottom-blowing converter through which air under pressure is blown, wherein the melt is dephosphorized by rapid formation of a basic liquid slag containing ferrous oxide, comprising the steps of blowing intermittently against the surface of the molten iron gas rich in oxygen at a low pressure and a low speed so as to preclude penetration of the oxygen into said molten bath, and adding to said bath at the beginning a slag-liquefying material and a cooling oxygen carrier, said slag formation being carried out at a simultaneous low speed of decarbonization amounting to 0.20 to 0.25% per minute, whereby the dephosphorization is at least partly advanced in time into the decarbonization period, said oxygen carrier including an ore.

References Cited in the file of this patent
UNITED STATES PATENTS

| 2,668,759 | Tenenbaum | Feb. 9, 1954 |
| 2,671,018 | Graef | Mar. 2, 1954 |

FOREIGN PATENTS

| 220,279 | Great Britain | Feb. 19, 1925 |